United States Patent
Handa

(10) Patent No.: US 7,391,600 B2
(45) Date of Patent: Jun. 24, 2008

(54) FEEDTHROUGH CAPACITOR AND MAGNETRON

(75) Inventor: Takanori Handa, Utsunomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 239 days.

(21) Appl. No.: 11/227,288

(22) Filed: Sep. 16, 2005

(65) Prior Publication Data

US 2006/0061933 A1    Mar. 23, 2006

(30) Foreign Application Priority Data

Sep. 17, 2004    (JP)    ............. P2004-271101

(51) Int. Cl.
   *H01G 4/35*    (2006.01)
(52) U.S. Cl. ................. 361/302; 361/303; 361/305; 361/306.3; 361/307; 361/308.1; 333/182; 333/185
(58) Field of Classification Search ......... 361/302–305, 361/307, 329–330, 311–313, 308.1, 321.2, 361/306.1, 301.2, 328; 333/182, 183, 185
See application file for complete search history.

(56) References Cited

U.S. PATENT DOCUMENTS

| | | | | |
|---|---|---|---|---|
| 4,811,161 | A * | 3/1989 | Sasaki et al. | 361/302 |
| 5,440,447 | A * | 8/1995 | Shipman et al. | 361/302 |
| 5,729,425 | A * | 3/1998 | Fujiwara et al. | 361/305 |
| 5,825,608 | A * | 10/1998 | Duva et al. | 361/302 |
| 6,288,886 | B1 * | 9/2001 | Sato et al. | 361/302 |
| 6,344,962 | B2 * | 2/2002 | Asada et al. | 361/302 |
| 6,414,835 | B1 * | 7/2002 | Wolf et al. | 361/302 |
| 6,765,780 | B2 * | 7/2004 | Brendel et al. | 361/302 |
| 6,819,541 | B2 * | 11/2004 | Hong | 361/302 |
| 6,888,715 | B2 * | 5/2005 | Stevenson et al. | 361/302 |

FOREIGN PATENT DOCUMENTS

| | | |
|---|---|---|
| JP | 01-135725 | 5/1989 |
| JP | 07-036432 | 2/1995 |
| JP | 2005-197224 | 7/2005 |

* cited by examiner

*Primary Examiner*—Nguyen T. Ha
(74) *Attorney, Agent, or Firm*—McDermott Will & Emery LLP

(57) ABSTRACT

In the capacitor, an insulating structural member 28 is arranged on an earth metal fitting 27. In the earth metal fitting 27, two sets of cylindrical-shaped portions 26 are separately arranged in an interval, and a floating portion 27a is formed. The insulating structural member 28 is arranged opposite to the floating portion 27a of this earth metal fitting 27 in such a manner that both a concave portion 28a and a convex portion 28b are formed on the insulating structural member 28 to be fitted to the cylindrical-shaped portion 26. Since a feedthrough conductor 29 penetrates a through hole 30 of the insulating structural member 28, the earth metal fitting 27, the insulating structural member 28, and the feedthrough conductor 29 are positioned with each other. Then, one opening portion 31a of an insulating case 31 is fitted into the floating portion 27a of the earth metal fitting 27. One opening portion 32a of an insulating cover 32 is fitted on the rear side of the floating portion 27a of the earth metal fitting 27 in such a manner that this opening portion 32a surrounds the feedthrough conductors 29 on another side of the earth metal fitting 27. An insulating resin 33 has been filled in such a way that this insulating resin 33 embeds therein a peripheral portion of the penetration portion of the feedthrough conductor 29.

9 Claims, 6 Drawing Sheets

Prior Art

FEEDTHROUGH CAPACITOR AND MAGNETRON

BACKGROUND OF THE INVENTION

1. Field of the Invention

The present invention is related to a feedthrough capacitor and a magnetron using this feedthrough capacitor.

2. Description of the Related Art

Referring now to FIG. 6 to FIG. 8, this sort of conventional feedthrough capacitor will be described. FIG. 6 is a sectional view for showing a conventional feedthrough capacitor equipped with a ceramic capacitor. FIG. 7 is a partially sectional view for representing a magnetron equipped with the feedthrough capacitor. FIG. 8 is a sectional view for indicating a conventional feedthrough capacitor which does not contain a ceramic capacitor.

The conventional feedthrough capacitor 1 shown in FIG. 6 has been equipped with two through holes 2 which are separately arranged in an interval, and an electrode 3a and another electrode 3b which are independently provided from each other on one plane of each of the through holes 2. A portion of a common electrode 4 of a ceramic capacitor 5 which owns the common electrode 4 has been fixed on a floating portion 8 of an earth metal fitting 7 having a through hole 6 by way of a soldering work, or the like. Two feedthrough conductors 11 have penetrated the independent electrodes 3a and 3b, while these two feedthrough conductors 11 own electrode connecting portions 9a and 9b, and have been covered with insulating tubes 10. The electrode connecting portions 9a and 9b have been fixed to the electrodes 3a and 3b by way of a soldering work, or the like, respectively. Then, an insulating case 12 has been mounted in such a manner that the floating portion 8 of the earth metal fitting 7 and the ceramic capacitor 5 are surrounded by an insulating cover 13. An insulating resin 14 such as an epoxy resin has been filled into a peripheral portion of the ceramic capacitor 5 which has been surrounded by both the insulating case 12 and the insulating cover 13. A terminal portion 11a of the above-explained feedthrough conductor 11 has constituted a terminal for connecting a wiring line, and the like.

As indicated in FIG. 7, the feedthrough capacitor 1 constructed in the above-described manner has been mounted on a side surface of a filter case 16 of the magnetron 15 and has been fixed, and an inductor 19 has been series-connected between a cathode terminal 18 of a cathode stem 17 and the feedthrough conductor 11 of the feedthrough capacitor 1 so as to be employed as a filter circuit of a power input unit of the magnetron 15.

However, since the feedthrough capacitor having the above-explained structure employs the ceramic capacitor, the following problems may occur:

(1) The soldering work, or the like must be carried out in order to connect the electrode portion, so that a heat resisting temperature is adversely influenced by a melting point of a solder, or the like.

(2) The insulating resin must be filled in order to secure a moisture resistance property and an insulating property. Since the thermal expansion coefficient of the insulating resin is different from that of the ceramic capacitor, peeling may occur on the contact planes between the insulating resin and the ceramic capacitor, so that a voltage withstanding failure may occur. It is practically difficult that the ceramic capacitor adheres to the insulating resin in such a manner that the peeling does not occur.

(3) While the cost of the ceramic capacitor is high, the assembling method cannot be simplified since the high assembling precision is required, so that higher cost is required.

In order to solve the above-described problems, such feedthrough capacitors which do not contain ceramic capacitors have been conceived (refer to, for example, Japanese Utility Model Application No. Hei-1-135725).

A feedthrough capacitor 20 shown in FIG. 8 has been provided with flat plate-shaped inner conductors 21a and 21b which are arranged parallel to each other; an outer conductor 22a having an elongated cylindrical shape which is arranged close to the inner conductor 21a in such a manner that the inner conductor 21a is surrounded by the outer conductor 22a; an outer conductor 22b having an elongated cylindrical shape which is arranged close to the inner conductor 21b in such a manner that the inner conductor 21b is surrounded by the outer conductor 22b; and a flange 23 formed with the outer conductors 22a and 22b in an integral body. All of these structural members have been molded in an integral body by employing either a thermosetting resin, or a thermoplastic resin, otherwise, such an insulating resin 24 which is manufactured by mixing dielectric ceramic powder with these resins. Also, the insulating resin 24 has been filled into a space between the inner conductor 21a and the outer conductor 22a, and another space between the inner conductor 21b and the outer conductor 22b. Thus, a capacitance has been produced between the inner conductor 21a and the outer conductor 22a, and another capacitance has been produced between the inner conductor 21b and the outer conductor 22b (refer to, for example, Japanese Utility Model Application No Hei-76432).

However, in the above-explained conventional feedthrough capacitor without containing the ceramic capacitor, the below-mentioned problems occur. That is, when the molding work is carried out by employing the insulating resin, the relative position between the feedthrough conductor and the earth metal fitting is shifted, and the insulating resin is insufficiently filled to produce an air gap. As a result, a voltage withstanding failure may occur. Also, the ceramic powder contained in the insulating resin is clustered on one side of the insulating resin while the insulating resin is being hardened, so that performance of the capacitors may be fluctuated.

SUMMARY OF THE INVENTION

The present invention has been made to solve the above-explained problems of the prior art, and therefore, has an object to provide both a capacitor and a magnetron, which are capable of being manufactured in low cost, and whose assembling method can be simplified, while a heat resisting property and a voltage withstanding characteristic can become superior and high reliability can be secured.

The above-described object may be achieved by the below-mentioned structures.

(1). A feedthrough capacitor, according to the present invention, is featured by such a feedthrough capacitor comprising: an earth metal fitting equipped with a cylindrical-shaped portion having a through hole; a feedthrough conductor which penetrates the earth metal fitting under non-contact condition; and an insulating layer which produces a capacitance between the earth metal fitting and the feedthrough conductor; in which the insulating layer owns an insulating structural member which is comprised of: both fitting means with respect to the earth metal member, and fitting means with respect to the feedthrough conductor.

With employment of the above-described structure, the earth metal fitting and the feedthrough conductor can be relatively positioned with each other by the insulating structural member.

(2). In the feedthrough capacitor recited in the above-described item (1), the feedthrough capacitor is featured by that the insulating layer is constituted by the insulating structural member and an insulating resin which is filled in such a manner that the insulating resin embeds a peripheral portion of a penetration portion through which the feedthrough conductor has passed.

With employment of the above-described structure, a capacitance of a capacitor may be produced between the earth metal fitting and the feedthrough conductor, and also, both a moisture resistance property and an insulating characteristic may be secured.

(3). In the feedthrough capacitor recited in the above-described item (1), or item (2), the feedthrough capacitor is featured by that the fitting means with respect to the earth metal fitting of the insulating structural member is comprised of: the cylindrical-shaped portion having the through hole, which is formed on a floating portion of the earth metal fitting; and a concave portion and a convex portion which are located opposite to the floating portion of the earth metal fitting.

With employment of the above-described structure, positioning of the insulating structural member and the earth metal fitting is carried out.

(4). In the feedthrough capacitor recited in any one of the above-described item (1) to item (3), the feedthrough capacitor is featured by that the fitting means with respect to the feedthrough conductor of the insulating structural component is comprised of: an engaging-purpose convex portion which is formed in the vicinity of a root of a terminal portion of the feedthrough conductor; and an engaging-purpose concave portion which is located opposite to the engaging-purpose convex portion of the feedthrough conductor formed on the insulating structural member.

With employment of the above-described structure, positioning of the insulating structural member and the feedthrough conductor is carried out.

(5). In the feedthrough capacitor as recited in any one of the above-described items (1) to (4), the feedthrough capacitor is featured by that the concave portion which has been formed as the fitting means of the insulating structural component is fitted in such a manner that an outer peripheral plane of the cylindrical-shaped portion of the earth metal fitting is contacted to the concave portion; and the convex portion which has been formed as the fitting means penetrates the cylindrical-shaped portion, while having a gap between the own convex portion and an inner peripheral plane of the cylindrical-shaped portion.

With employment of the above-described structure, positioning of the insulating structural member and the earth metal fitting is carried out.

(6). In the feedthrough capacitor as recited in any one of the above-described items (1) to (3), and (5), this feedthrough capacitor is featured by that while the fitting means with respect to the feedthrough conductor of the insulating structural member is constituted by a lid-shaped portion which is formed in the vicinity of a root of a terminal portion of the feedthrough conductor, and an engaging-purpose concave portion which is located opposite to the lid-shaped portion formed on the insulating structural member, an area of such a plane of the lid-shaped portion, which is located opposite to the through hole of the earth metal fitting, is made larger than an area of the opening portion of the through hole formed in the earth metal member.

With employment of the above-described structure, positioning of the insulating structural member and the feedthrough conductor can be further improved, as compared with that of the above-described (4). Also, noise can be reduced which is leaked along such a direction from the through holes of the earth metal fittings to the terminal portions of the feedthrough conductors.

(7). In a feedthrough capacitor recited in any one of the above-described items (1) to (6), the feedthrough capacitor is featured by that a concave and a convex are formed on a tip portion of a cylindrical-shaped portion having a through hole, which is formed on the floating portion of the earth metal fitting.

With employment of the above-explained structure, when the insulating resin is filled, the insulating resin may be intertwined under better condition.

(8). In a magnetron having a filter constructed of a feedthrough capacitor, the above-explained feedthrough capacitor is featured by any one of the above-described items (1) to (7).

With employment of the above-described structure, since the magnetron owns the filter which is arranged by the higher reliable feedthrough capacitor, the reliability of this magnetron itself can be improved.

As previously explained, in accordance with the feedthrough capacitor and the magnetron of the present invention, the feedthrough capacitor is provided with the earth metal fitting having the through hole; the feedthrough conductor which penetrates this earth metal fitting under non-contact condition, and the insulating structural member having the positioning structure between the earth metal fitting and the feedthrough conductor, by which the relative position between the earth metal fitting and the feedthrough conductor is fixed. As a result, the insulating structural member may function as a capacitor. Therefore, while the ceramic capacitor is no longer required, there is no risk that the voltage withstanding failure may be conducted. This voltage withstanding failure is caused by peeling of the contact planes between the ceramic capacitor and the insulating resin, which constitutes such a problem that the ceramic capacitor has been built in the conventional feedthrough capacitor. Also, the soldering work used to fix the earth metal fitting, the ceramic capacitor, and the electrode connecting portion to each other is no longer required. In addition, since the relative position between the earth metal fitting and the feedthrough conductor is fixed, a fluctuation in capacitor performance can be suppressed. As a consequence, the heat resistance property can be improved, the assembling method can be simplified, and also, the manufacturing cost can be lowered.

DESCRIPTION OF THE PREFERRED EMBODIMENTS

Referring now to drawings, preferred embodiment modes of the present invention will be described.

Embodiment Mode 1

Figure 1:
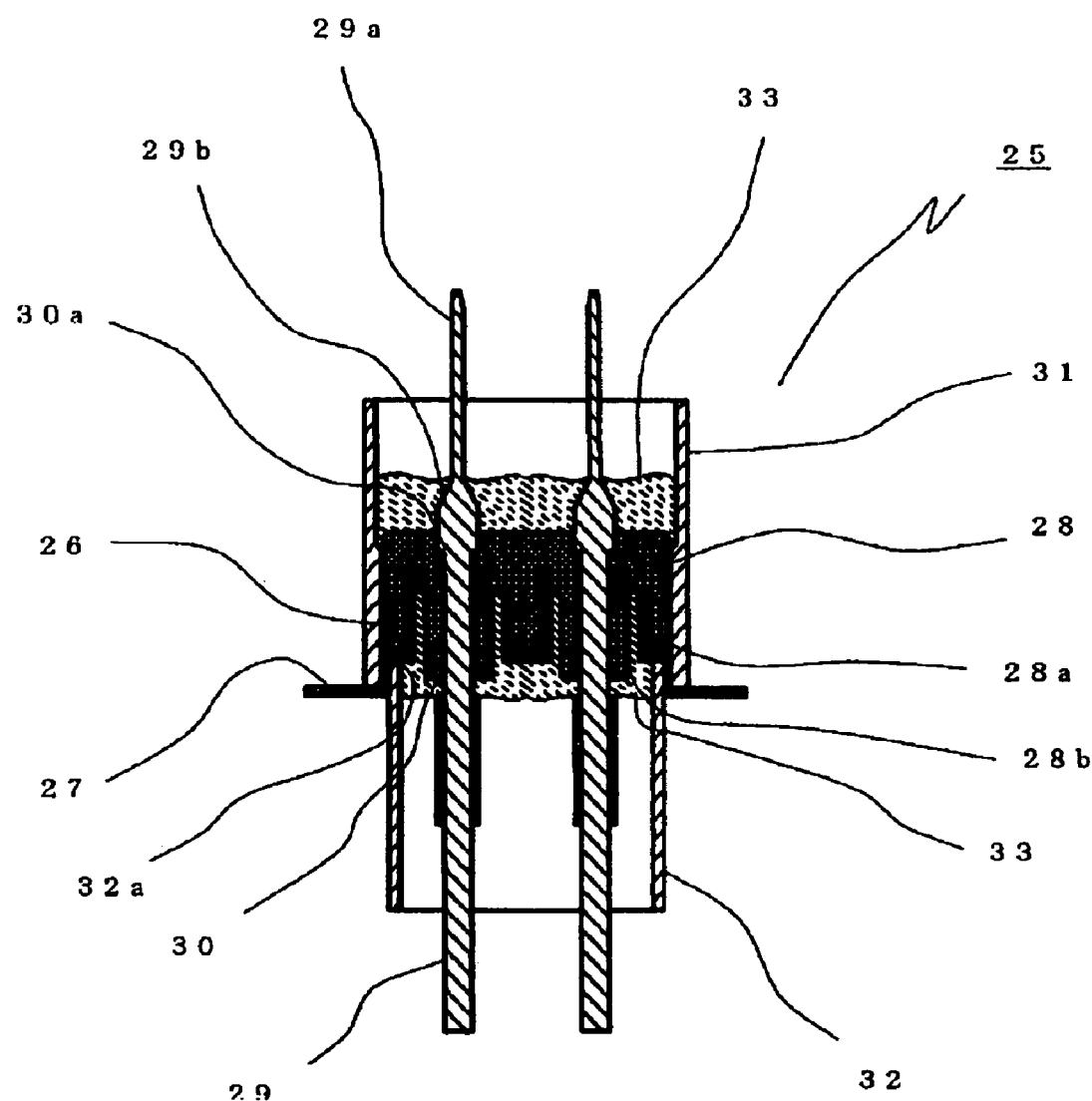
FIG. 1 is a sectional view for showing a feedthrough capacitor according to an embodiment mode 1 of the present invention.
Figure 2:
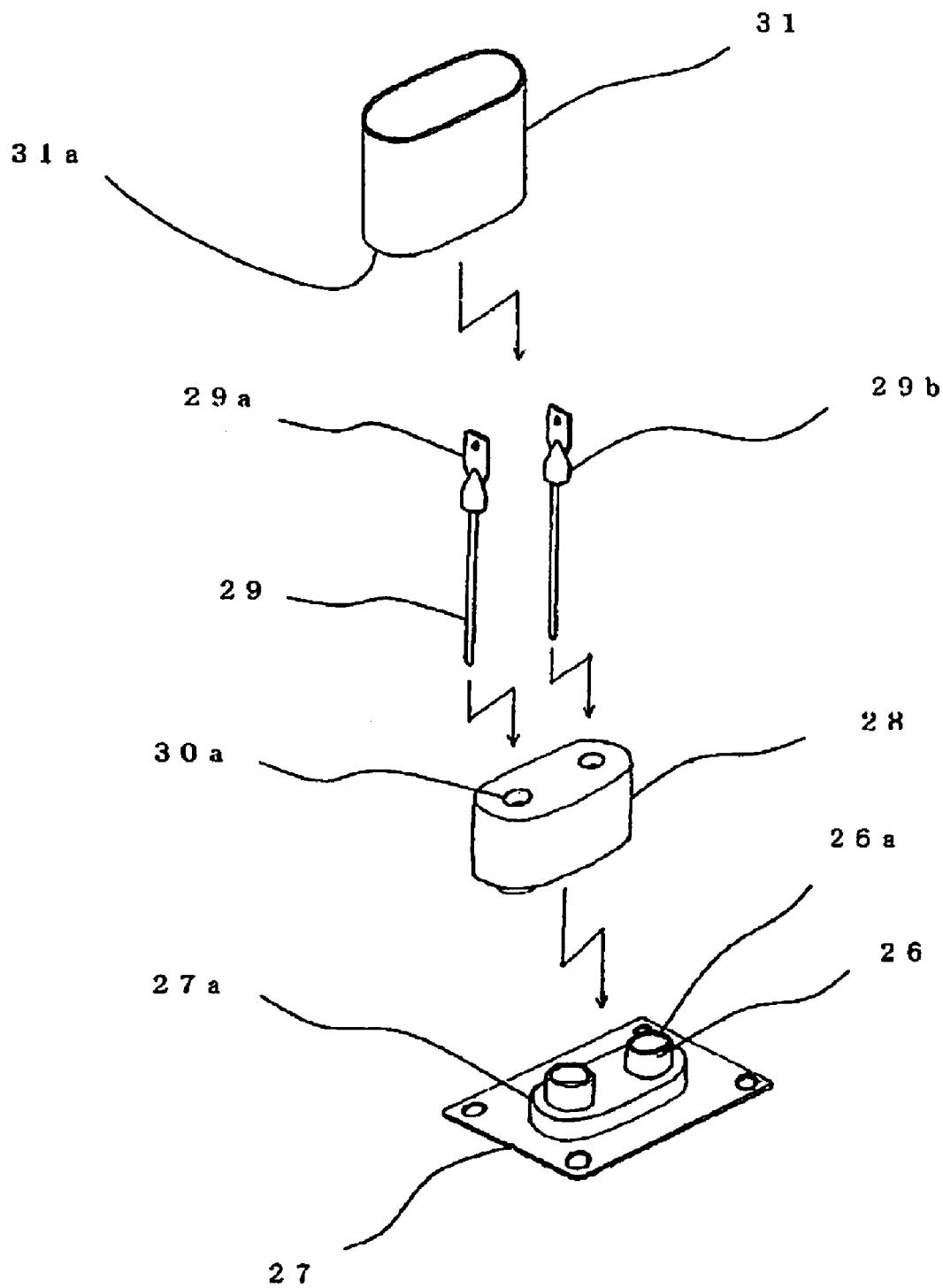
FIG. 2 is an exploded perspective view for representing a major portion of the feedthrough capacitor according to the embodiment mode 1 of the present invention.

FIG. 1 is a sectional view for showing a feedthrough capacitor 25 according to an embodiment mode 1 of the present invention. FIG. 2 is an exploded perspective view for representing a major portion of the feedthrough capacitor 25 of FIG. 1. In the feedthrough capacitor 25, an insulating structural member 28 has been arranged on an earth metal fitting 27. In the earth metal fitting 27, two sets of cylindrical-shaped portions 26 each having through holes 26a are separately arranged in an interval, and a floating portion 27a is formed. The insulating structural member 28 has been arranged opposite to the floating portion 27a of this earth metal fitting 27 in such a manner that both a concave portion 28a and a convex portion 28b are formed on the insulating structural member 28 to be fitted to the cylindrical-shaped portion 26. An outer peripheral plane of the cylindrical-shaped portion 26 of the earth metal fitting 27 is fitted to the concave portions 28a of the insulating structural member 28 in such a manner that this outer peripheral plane is contacted to the concave portion 28a. The convex portion 28b of the insulating structural member 28 penetrates the cylindrical-shaped portion 26 while having a gap between this insulating structural member 28 and an inner peripheral plane of the cylindrical-shaped portion 26. A through hole 20 has been formed at a substantially center portion of this concave portion 28b, while the through hole 30 is provided in order to cause a feedthrough conductor 29 to penetrate this through hole 30 under non-contact condition with respect to the above-explained earth metal fitting 27. Both a terminal portion 29a and an engaging-purpose convex portion 29b have been formed at one terminal portion of the feedthrough conductor 29. The terminal portion 29a is used to connect a wiring line, or the like. The engaging-purpose convex portion 29b is expanded in the vicinity of a root of this engaging-purpose convex portion 29b. Also, an engaging-purpose concave portion 30a has been formed in the through hole 30 of the insulating structural member 28 located opposite to the engaging-purpose convex portion 29b. The feedthrough conductor 29 which has been formed in the above-described manner penetrates the through hole 30 of the insulating structural member 28 under such a condition that the engaging-purpose concave portion 30a is fitted to the engaging-purpose convex portion 29b, so that the earth metal fitting 27, the insulating structural member 28, and the feedthrough conductor 29 may be positioned with each other. Then, one opening portion 31a of an insulating case 31 has been fitted into the floating portion 27a of the earth metal fitting 27 in such a manner that this opening portion 31a surrounds the insulating structural member 28. One opening portion 32a of an insulating cover 32 has been fitted on a rear side of the floating portion 27a of the earth metal fitting 27 in such a manner that this opening portion 32a surrounds the feedthrough conductors 29 on another side of the earth metal fitting 27. Then, in order to secure both the moisture resistance property and the insulating property, an insulating resin 33 has been filled into the outer side portion of the insulating structural member 28 which is surrounded by both the insulating case 31 and the insulating cover 32 in such a manner that this insulating resin 33 embeds therein feedthrough peripheral portions of the feedthrough conductors 29. At this time, the insulating resin 33 is filled into a gap between the convex portion 28b of the insulating structural member 28 and the inner peripheral plane of the cylindrical-shaped portion 26 of the earth metal fitting 27, and thus, the earth metal fitting 27, the insulating structural member 28, and the feedthrough conductors 29 are fixed under such a condition that these structural members 27, 28, 29 are positioned with each other, so that both the moisture resistance property and the insulating property can be firmly secured.

Since the feedthrough capacitor 25 employs the above-explained structure, the earth metal fitting, the feedthrough conductors, and the insulating case may be relatively positioned with each other by the insulating structural member. Positioning of these structural members has been carried out by fitting these structural members by way of a clearance fit, or a transition fit. Since the insulating structural member is located between the earth metal fitting and the feedthrough conductors, this insulating structural member may function as a capacitor. As a result, while a ceramic capacitor is no longer required, there is no risk that the voltage withstanding failure is induced which is caused by peeling of the contact planes between the ceramic capacitor and the insulating resin. Furthermore, since the relative positions of these structural members are fixed, fluctuations of capacitor performance may be suppressed and also the soldering work is no longer required. As a result, the heat resisting property may be improved, the assembling method may be simplified, and thus, the manufacturing cost may be decreased. It should be understood that if any insulating structural member has neither an air gap, nor a pinhole, which may cause the voltage withstanding failure, then various sorts of insulating structural members having various sorts of insulating materials may be used. Also, in the above-described example, the insulating structural member and the insulating case have been constituted as separate components. Alternatively, the insulating structural member and the insulating case may be formed in an integral body.

Embodiment Mode 2

Next, an embodiment mode 2 of the present invention will now be explained.

Figure 3:
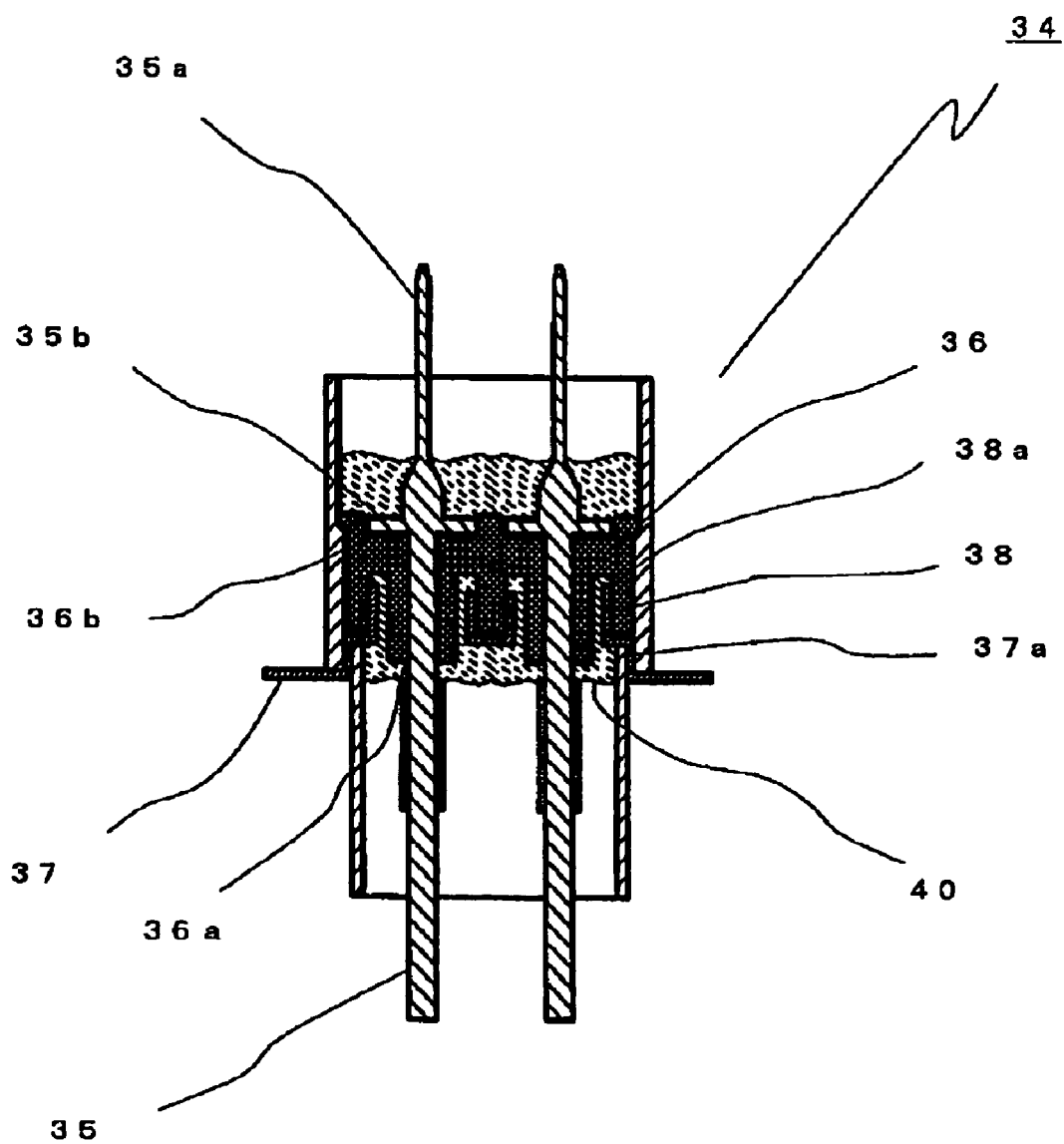
FIG. 3 is a sectional view for indicating a feedthrough capacitor according to an embodiment mode 2 of the present invention.
Figure 4:
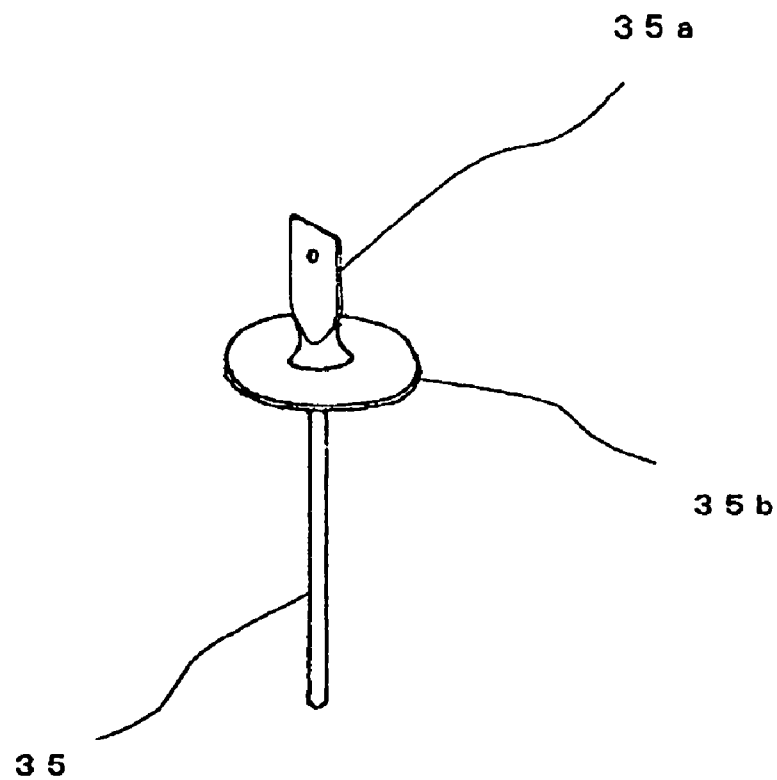
FIG. 4 is a perspective view for indicating a feedthrough conductor of FIG. 3.
Figure 5:
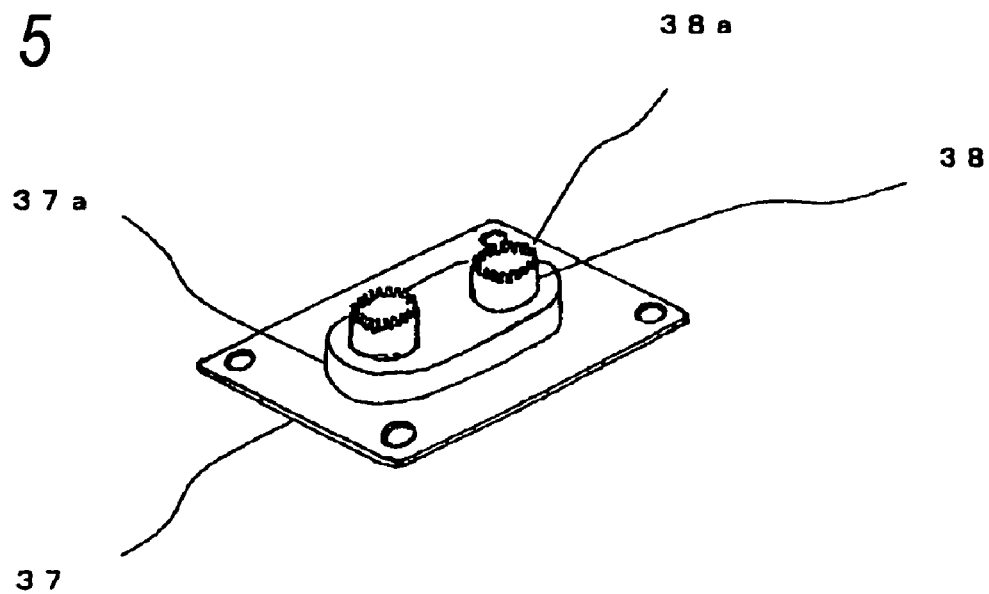
FIG. 5 is a perspective view for representing an earth metal fitting of FIG. 3.
Figure 6:
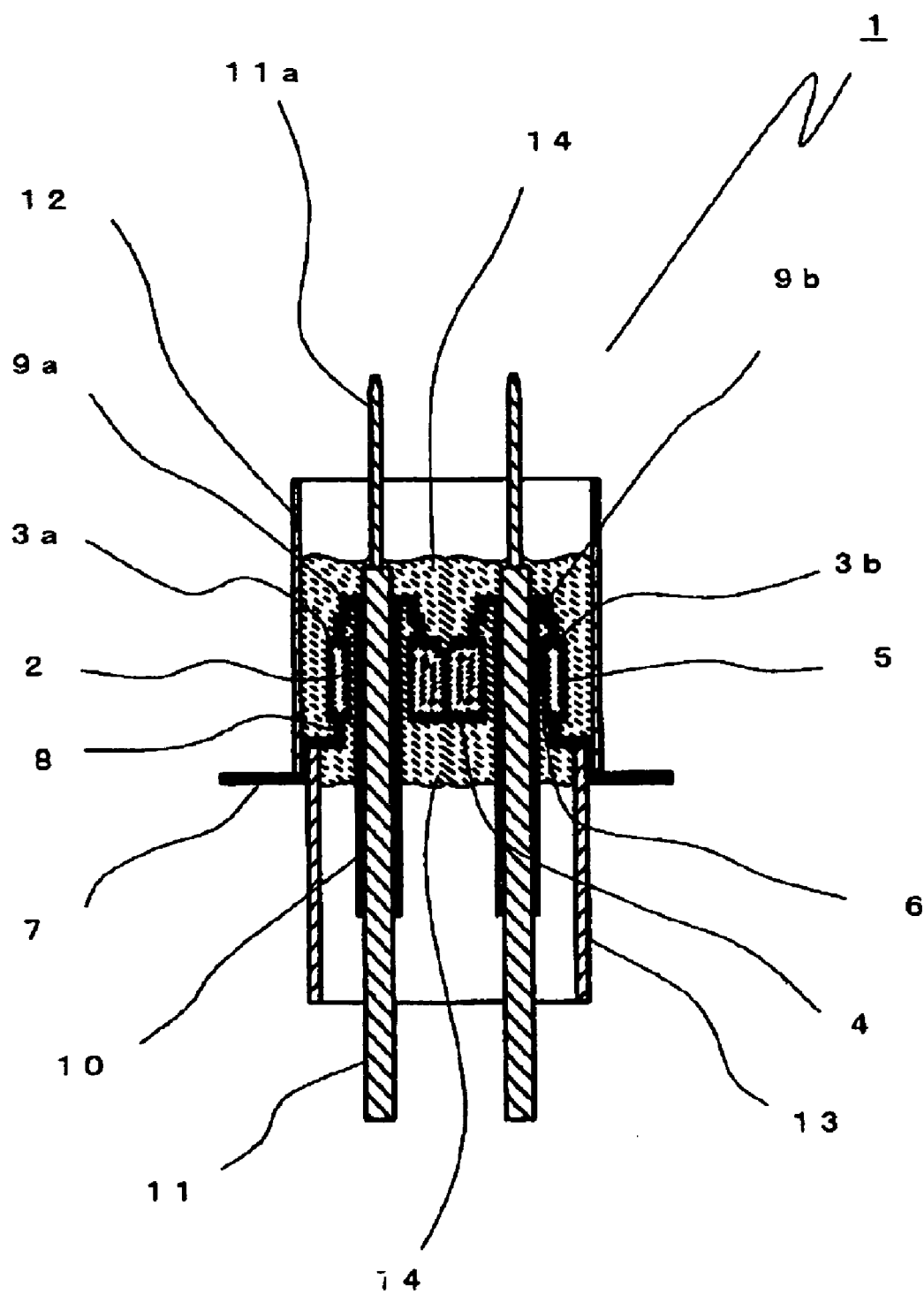
FIG. 6 is a sectional view for indicating the conventional feedthrough capacitor equipped with the ceramic capacitor.
Figure 7:
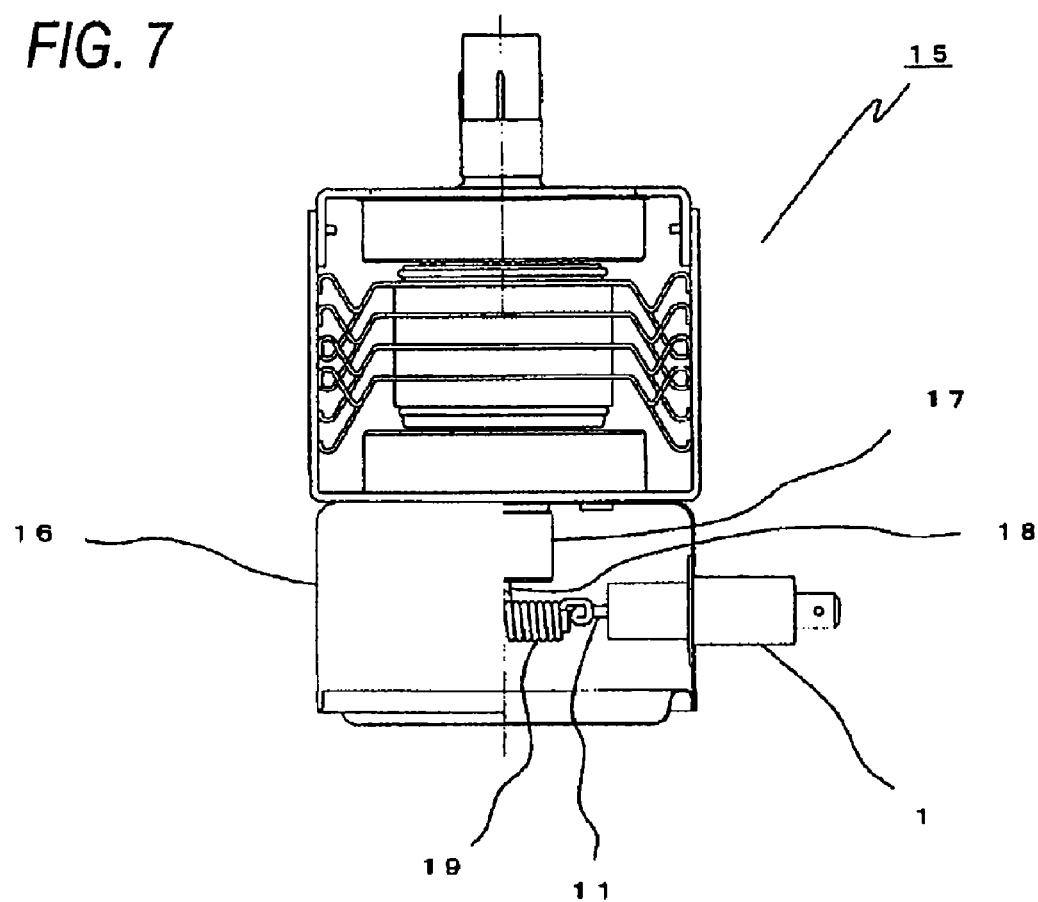
FIG. 7 is a partially sectional view for showing the magnetron equipped with the feedthrough capacitor.
Figure 8:
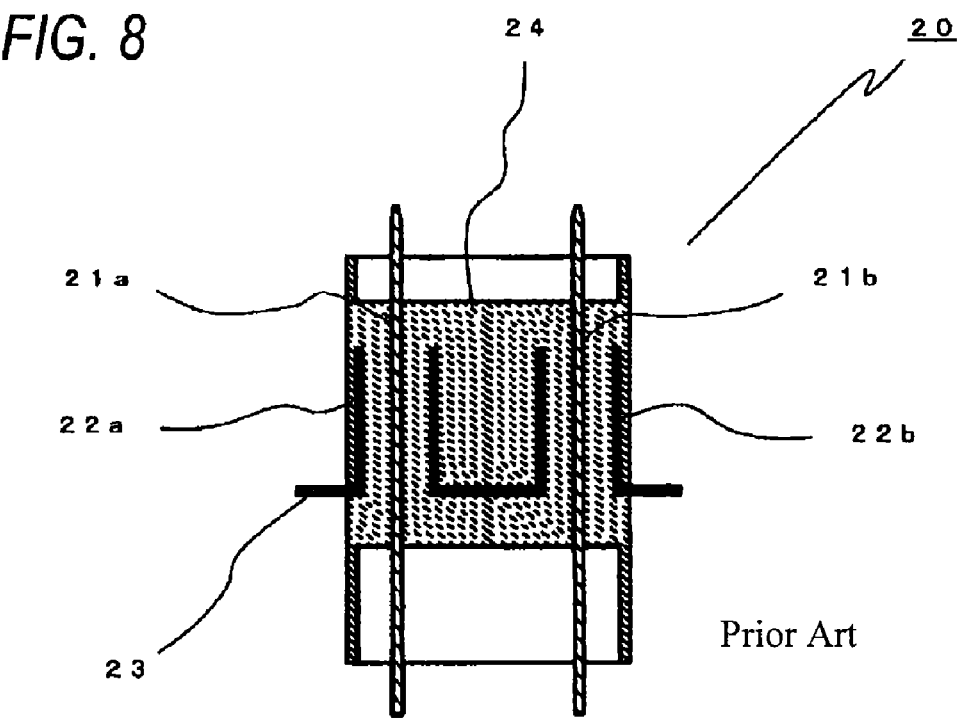
FIG. 8 is a sectional view for showing the conventional feedthrough capacitor which does not contain the ceramic capacitor.

FIG. 3 is a sectional view for showing a feedthrough capacitor 34 according to the embodiment mode 2 of the present invention. FIG. 4 is a perspective view for indicating a feedthrough conductor 35 according to the embodiment mode 2. FIG. 5 is a perspective view for representing an earth metal fitting 37 according to the embodiment mode 2. In the feedthrough capacitor 34 of this embodiment mode 2 shown in FIG. 3, different points thereof from the feedthrough capacitor 25 of the embodiment mode 1 shown in FIG. 1 are given as follows: That is, as shown in FIG. 2, a circular lid-shaped portion 35b has been provided in the vicinity of a root of a terminal portion 35a for connecting a wiring line, and the like, while this circular lid-shaped portion 35b has been provided at an edge portion of the feedthrough conductor 35; an engaging-purpose concave portion 36b to which the above-explained lid-shaped portion 35b has been fitted is made large in a through hole 36a of an insulating structural member 36 through which the feedthrough conductor 35 passes through; and also, as represented in FIG. 5, a concave and a convex have been formed on a tip portion 38a of a cylindrical-shaped portion 38 having through holes which have been separately formed in an interval in a floating portion 37a of an earth metal fitting 37. It should be understood that an area of such a plane of the lid-shaped portion 35b on the side opposite to the through holes of the earth metal fitting 37 has been made larger than an area of openings of the through holes formed in the earth metal fitting 37.

As previously explained, since the lid-shaped portion 35b is provided with the feedthrough conductor 35, noise can be reduced which is leaked along a direction from the through holes of the earth metal member 37 to the edge portions 35a of the feedthrough conductors 35, and also, the facing area between the feedthrough conductors 35 and the earth metal fittings 37 can be increased, so that the capacitance can be further increased. Also, the engaging-purpose concave portion 36b formed in the insulating structural member 36 is fitted with the lid-shaped portion 35b of the feedthrough conductor 35 under large contact area, so that positioning of the structural members can be more firmly carried out in the assembling steps.

Moreover, since the concave and convex are formed in the edge portion 38a of the cylindrical-shaped portion 38 which is provided on the floating portion 37a of the earth metal fitting 37, when the insulating resin 40 is filled, the insulating resin 40 can be sufficiently intertwined with the earth metal fitting 37, and thus, can be hardly filled in an insufficient manner. Also, peeling of the contact planes between the filled insulating resin and the earth metal fitting can hardly occur.

As a consequence, the highly reliable capacitor with the superior heat resistance property and the voltage withstanding characteristic can be obtained, and also, the assembling method can be simplified, and the cost can be decreased.

It should also be understood that if any insulating structural member has neither an air gap, nor a pinhole, which may cause the voltage withstanding failure, then various sorts of insulating structural members having various sorts of insulating materials may be used. Further, the structure of the earth metal fitting need not be made of such a cylindrical shape, but also the concave and convex formed in the tip portion of the through hole having the cylindrical-shaped structure may be alternatively employed, while extraction burrs are left in the case that, for example, a press molding operation is performed. Also, the shape of the lid-shaped portion of the feedthrough conductor need not be made of a circular shape.

Since the capacitor and the magnetron of the present invention may have the extremely good heat resistance property, voltage withstanding characteristic, and reliability, these capacitor and magnetron may be effectively used in microwave ovens and industrial fields.

What is claimed is:

1. A feedthrough capacitor, comprising:
an earth metal fitting, equipped with a cylindrical-shaped portion including a through hole;
a feedthrough conductor, penetrating the earth metal fitting under non-contact condition; and
an insulating layer, producing a capacitance between the earth metal fitting and the feedthrough conductor;
wherein the insulating layer comprises an insulating structural member comprised of first fitting means engaged with the earth metal member, and
wherein the insulating structural member is further comprised of second fitting means engaged with the feedthrough conductor.

2. The feedthrough capacitor according to claim 1, wherein the insulating layer is comprised of:
an insulating resin, filled in such a manner that the insulating resin embeds the insulating structural member and a peripheral portion of a penetration portion through which the feedthrough conductor is passed.

3. The feedthrough capacitor according to claim 2, wherein:
a concave and convex are formed on a tip portion of the cylindrical-shaped portion.

4. The feedthrough capacitor according to claim 1, wherein the cylindrical-shaped portion is formed on a floating portion of the earth metal fitting;
the first fitting means is comprised of a concave portion and a convex portion which are formed on the insulating structural member and located at a side opposed to the cylindrical-shaped portion of the earth metal fitting.

5. The feedthrough capacitor according to claim 4 wherein:
the concave portion is fitted such that an outer peripheral plane of the cylindrical-shaped portion is contacted to the concave portion; and
the convex portion is penetrating the cylindrical-shaped portion, while having a gap between the convex portion and an inner peripheral plane of the cylindrical-shaped portion.

6. The feedthrough capacitor according to claim 1, wherein a convex portion is formed in the vicinity of a root of a terminal portion of the feedthrough conductor; and
the second fitting means is comprised of an concave portion which are formed on the insulating structural member and located opposes to the convex of the earth metal fitting.

7. The feedthrough capacitor according to claim 1, wherein a lid-shaped portion is formed in the vicinity of a root of a terminal portion of the feedthrough conductor; and
the second fitting means is comprised of a concave portion which are formed on the insulating structural member and located opposes to the convex portion of the earth metal fitting.

8. The feedthrough capacitor according to claim 7, wherein an area of the lid-shaped portion is larger than an area of the opening portion of the through hole formed in the earth metal member.

9. A magnetron, comprising:
a filter, constructed of the feedthrough capacitor according to claim 1.

* * * * *